(12) United States Patent
Greenwood et al.

(10) Patent No.: US 9,162,644 B2
(45) Date of Patent: Oct. 20, 2015

(54) HATCH PROTECTION SYSTEM

(71) Applicant: Black Mountain Industries, Inc., Bryan, TX (US)

(72) Inventors: Kyle L. Greenwood, Bryan, TX (US); James Buckner, Bryan, TX (US); Joshua Price, Bryan, TX (US); Matthew Howell, Bryan, TX (US); Devin Gerland, Bryan, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 0 days.

(21) Appl. No.: 14/025,554

(22) Filed: Sep. 12, 2013

(65) Prior Publication Data
US 2014/0203593 A1   Jul. 24, 2014

Related U.S. Application Data

(63) Continuation of application No. 13/364,260, filed on Feb. 1, 2012, now Pat. No. 8,556,334.

(51) Int. Cl.
| | |
|---|---|
| *B60R 21/055* | (2006.01) |
| *B60R 21/235* | (2006.01) |
| *F41H 5/22* | (2006.01) |
| *B60R 21/26* | (2011.01) |
| *B60R 21/00* | (2006.01) |

(52) U.S. Cl.
CPC ............. *B60R 21/055* (2013.01); *B60R 21/235* (2013.01); *F41H 5/223* (2013.01); *B60R 21/26* (2013.01); *B60R 2021/0074* (2013.01); *Y10T 29/49826* (2013.01)

(58) Field of Classification Search
CPC ............................ B60J 10/0037; B60R 21/055

USPC ............ 280/749, 751, 728.1, 728, 2, 730.1, 280/730.2; 89/36.07–36.12; 296/187.05, 296/146.9, 214, 216.07, 212, 217; 49/381, 49/504, 477.1, 482.1; 114/201 R, 201 A

See application file for complete search history.

(56) References Cited

U.S. PATENT DOCUMENTS

| | | | | |
|---|---|---|---|---|
| 2,051,757 | A | * | 8/1936 | Travis .......................... 49/489.1 |
| 3,806,152 | A | * | 4/1974 | Witchger ...................... 280/751 |
| 4,811,680 | A | * | 3/1989 | Genth ....................... 114/201 R |
| 6,125,591 | A | * | 10/2000 | Schmidhuber et al. ...... 49/477.1 |
| 6,343,831 | B1 | * | 2/2002 | Nabert et al. ............ 296/187.05 |
| 6,357,187 | B1 | * | 3/2002 | Haldeman ....................... 52/211 |

(Continued)

FOREIGN PATENT DOCUMENTS

EP           0385222       *   2/1990

OTHER PUBLICATIONS

Machine translation of EP0385222.*

(Continued)

*Primary Examiner* — Dennis H Pedder
(74) *Attorney, Agent, or Firm* — Tumey L.L.P.

(57) ABSTRACT

A hatch protection system and method protect personnel against blunt force trauma caused by contact with a hatch. In an embodiment, a hatch protection system for a hatch on a vehicle includes a hatch pad. The hatch pad is attached to the hatch. In addition, the hatch pad comprises a protective padding. Further, the hatch pad is adapted to be raised, lowered, or any combinations thereof. The hatch protection system also includes a plurality of brackets. The plurality of brackets is secured to the vehicle and to the hatch pad.

20 Claims, 11 Drawing Sheets

(56) References Cited

U.S. PATENT DOCUMENTS

| | | | |
|---|---|---|---|
| 6,520,571 B2* | 2/2003 | Stemmer et al. | 296/216.06 |
| 7,147,276 B2 | 12/2006 | Pfeffer et al. | |
| 7,845,707 B2* | 12/2010 | Huang et al. | 296/146.9 |
| 2008/0110387 A1* | 5/2008 | Hopper et al. | 114/203 |
| 2009/0100761 A1* | 4/2009 | Hashimoto et al. | 49/475.1 |
| 2011/0253839 A1* | 10/2011 | Ross | 244/121 |
| 2011/0298237 A1* | 12/2011 | Klein | 296/1.04 |

OTHER PUBLICATIONS

International Search Report and Written Opinion for International Application No. PCT/US2013/23331 dated Sep. 30, 2013.

* cited by examiner

HATCH PROTECTION SYSTEM

CROSS-REFERENCE TO RELATED APPLICATIONS

This application is a continuation application that claims the benefit of U.S. application Ser. No. 13/364,260 filed on Feb. 1, 2012, which is incorporated by reference herein in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of military applications and more specifically to the field of blunt force trauma protection systems for military personnel.

2. Background of the Invention

There is an increasing need for added protection for personnel in hatches of military vehicles. Improvised explosive devices and other methods for attacking military vehicles have drawn added interest in the safety of personnel. Conventional methods for protecting personnel include reliance on the outer armor of the vehicle. Drawbacks to such conventional methods include instances in which force from the explosive devices enters the interior of the military vehicle or impacts against the side of the vehicle, or instances in which maneuvering of the vehicle to avoid a blast or other related obstacles may place the personnel at severe risk of injury or death. For instance, the blunt force trauma from contact of the personnel against the sides of the hatch may place the personnel at such risk.

Methods have been developed to overcome such drawbacks. For instance, reactive armor on the outside of the military vehicle and body armor worn by the personnel have been developed. Drawbacks to such developments continue to include injury from blunt force trauma.

Consequently, there is a need for improved methods for protecting personnel in hatches of military vehicles from blunt force trauma.

BRIEF SUMMARY OF SOME OF THE PREFERRED EMBODIMENTS

These and other needs in the art are addressed in an embodiment by a hatch protection system for a hatch on a vehicle. The hatch protection system includes a hatch pad. The hatch pad is attached to the hatch. In addition, the hatch pad comprises a protective padding. Further, the hatch pad is adapted to be raised, lowered, or any combinations thereof. The hatch protection system also includes a plurality of brackets. The plurality of brackets are secured to the vehicle and to the hatch pad.

These and other needs in the art are further addressed in an embodiment by a method for protecting personnel against blunt force trauma from contact with a hatch on a vehicle. The method includes attaching a plurality of brackets to the vehicle. The method also includes attaching a hatch pad to the brackets. The hatch pad includes a protective padding. In addition, the hatch pad includes more than one hatch pad section. The hatch pad substantially covers an inner edge of the hatch.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
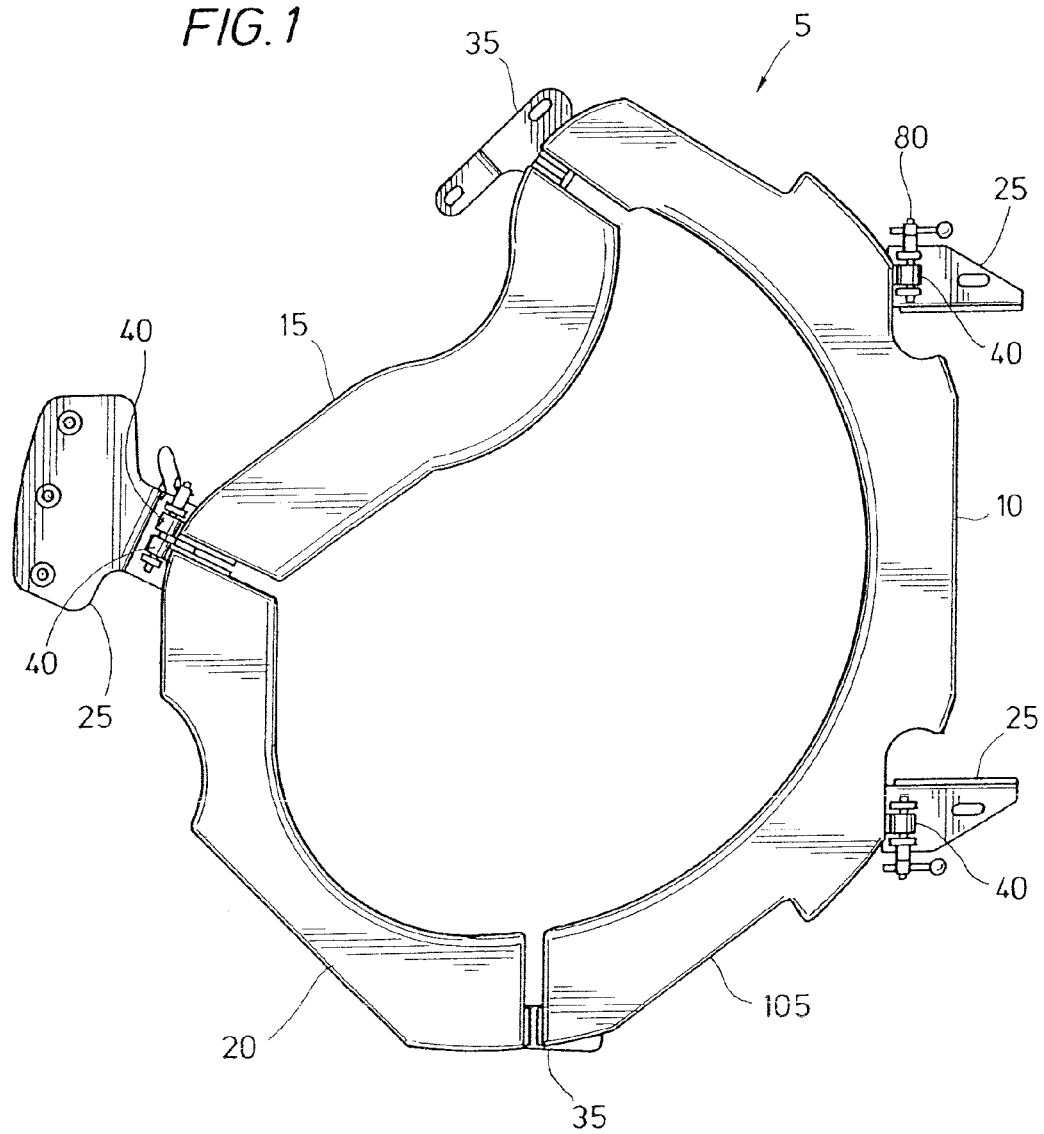
FIG. 1 illustrates a top view of an embodiment of a hatch protection system.
Figure 2:
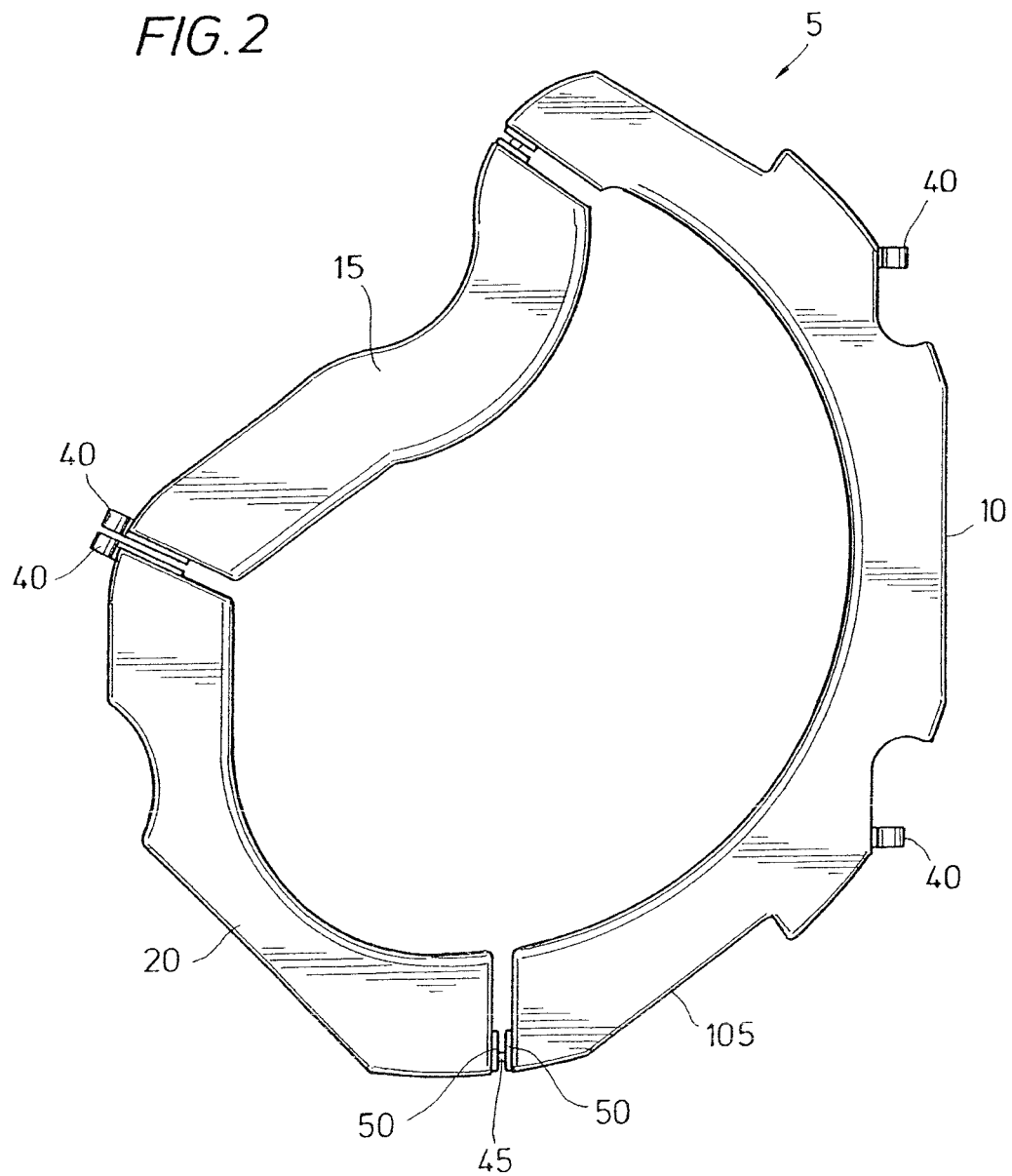
FIG. 2 illustrates a top view of an embodiment of hatch pads with hooks.
Figure 3:
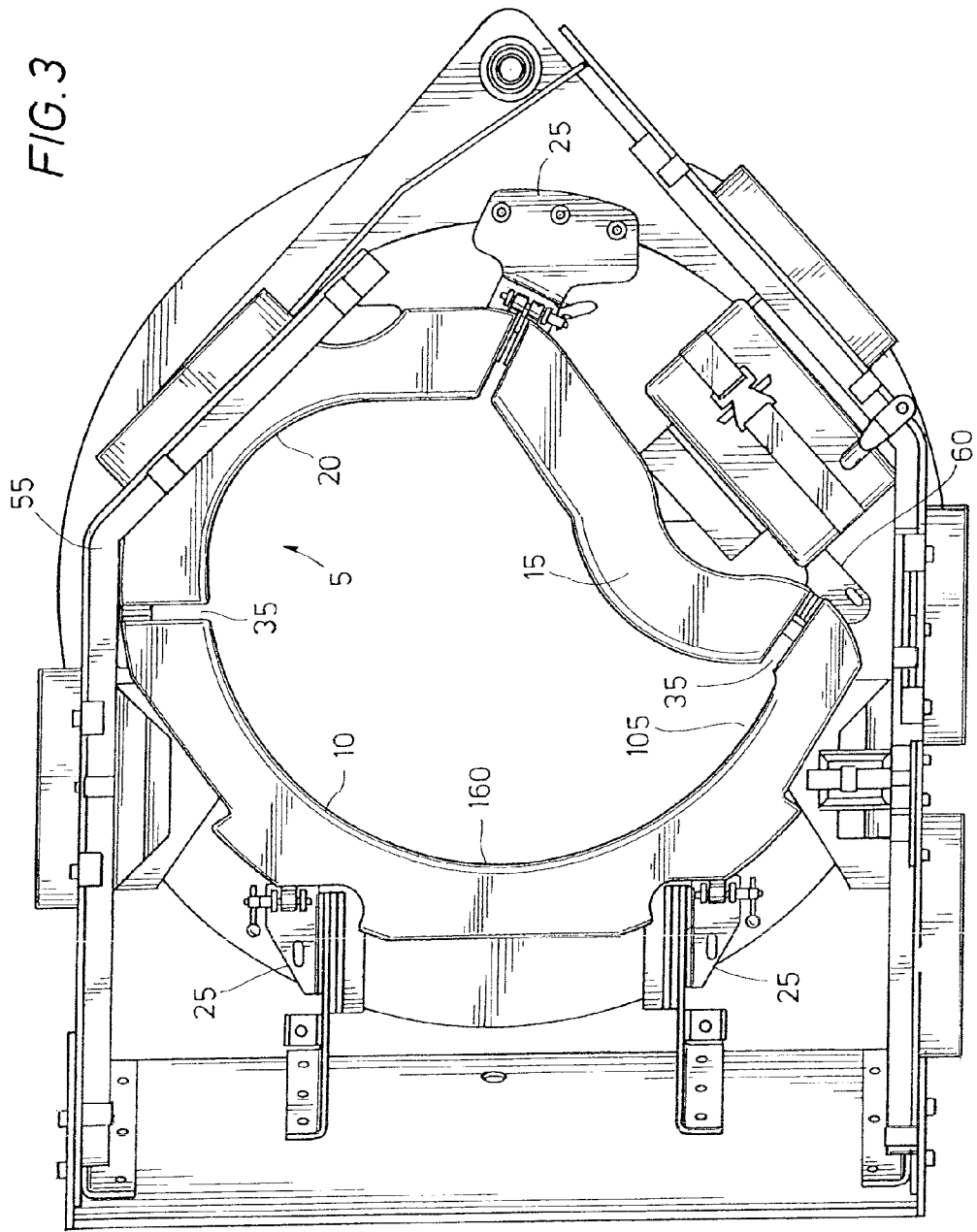
FIG. 3 illustrates a top view of an embodiment of a hatch protection system in a hatch of a military vehicle.
Figure 4:
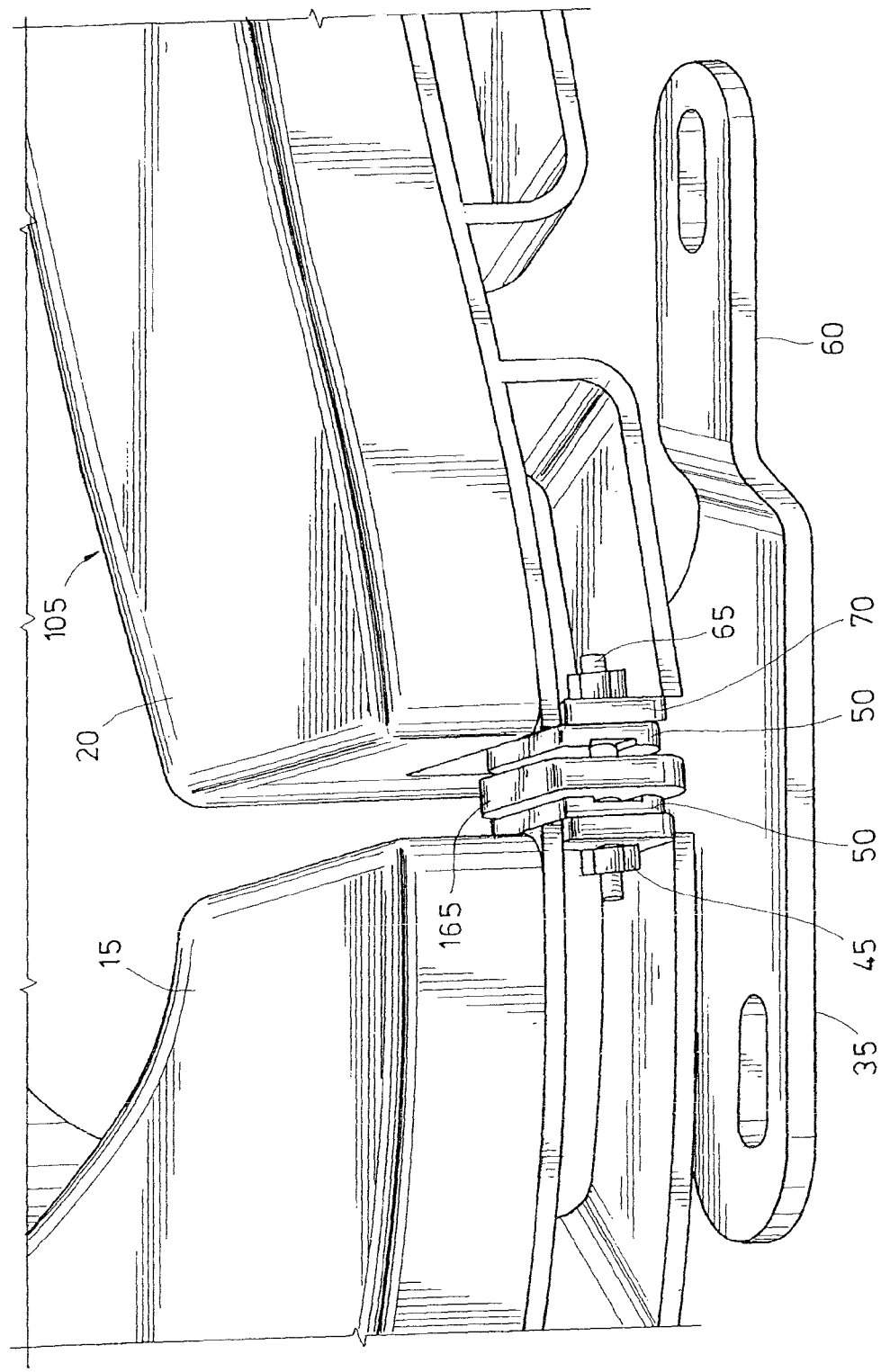
FIG. 4 illustrates an embodiment of a bracket mount.
Figure 5:
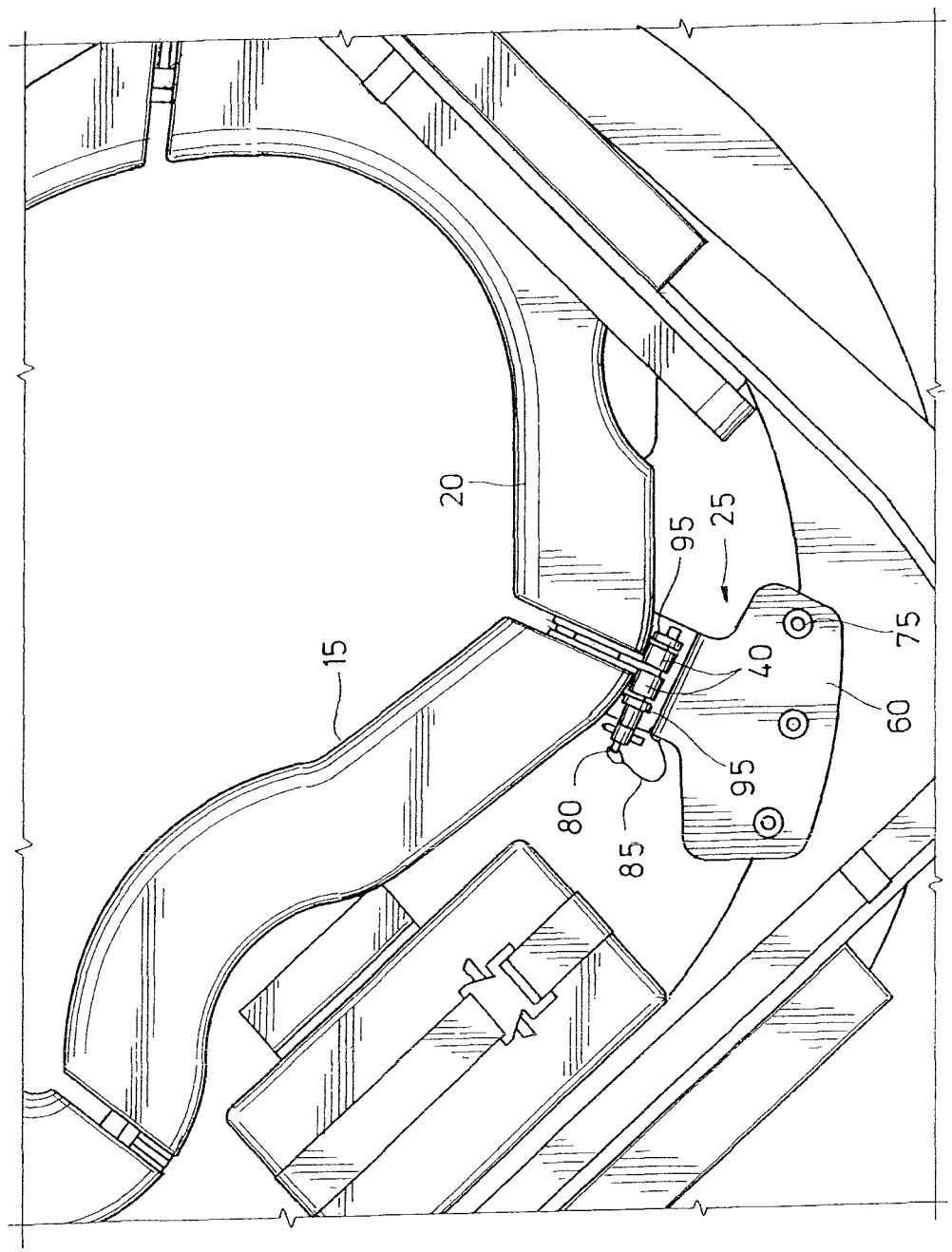
FIG. 5 illustrates an embodiment of a hatch protection system with a pin bracket and disposed in a hatch.
Figure 6:
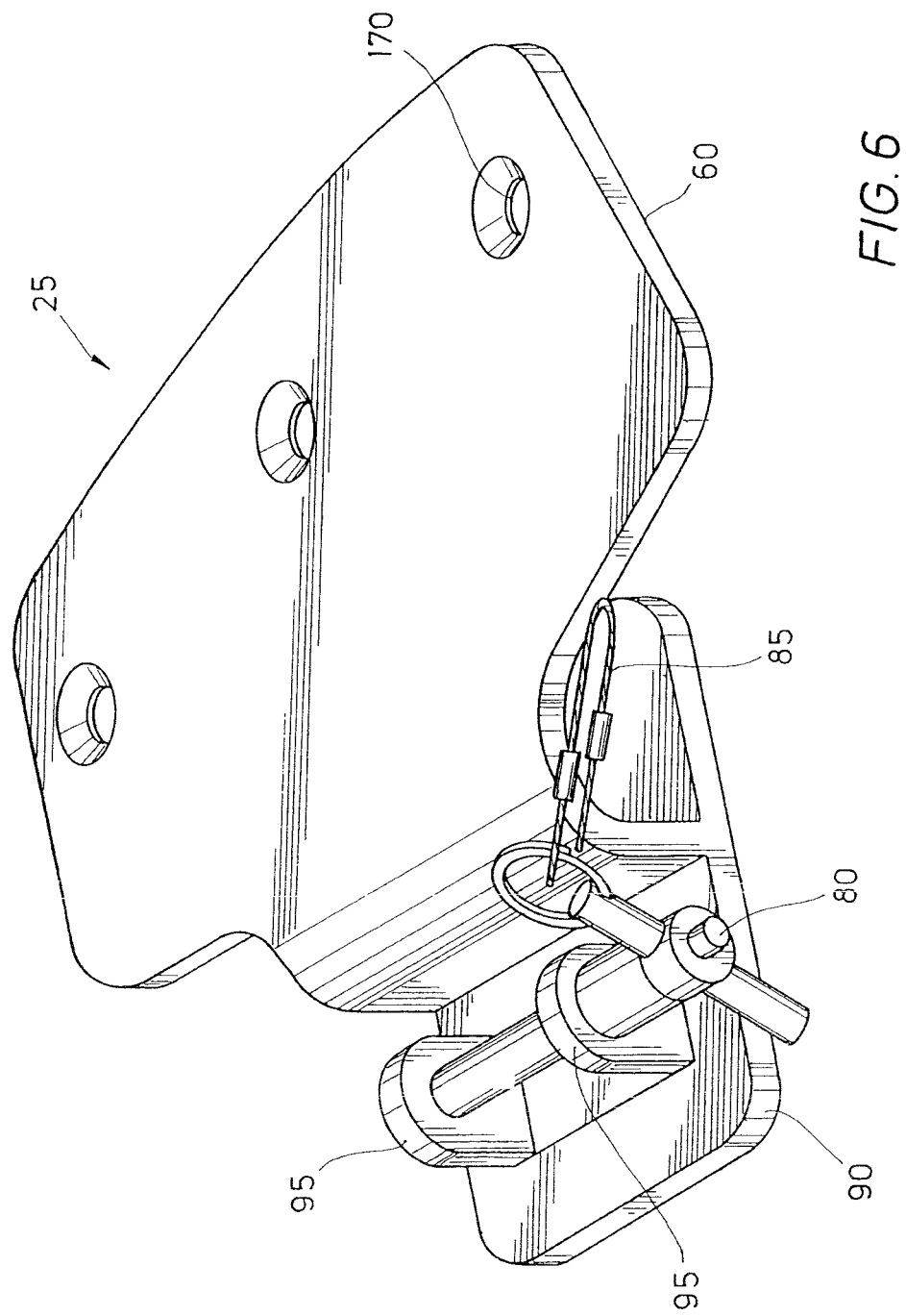
FIG. 6 illustrates an embodiment of a pin bracket.

FIG. 1 illustrates an embodiment of hatch protection system 5 having hatch pad 105, pin brackets 25, and bracket mounts 35. FIG. 2 illustrates an embodiment of hatch pad 105. FIG. 3 illustrates an embodiment of hatch protection system 5 disposed in hatch 55 of a military vehicle. Hatch protection system 5 provides protection for personnel (i.e., military personnel) in hatch 55 from potentially damaging blunt force trauma from contact against the sides of hatch 55. For instance, without limitation, hatch protection system 5 provides protection to the ribs, head, and the like of personnel by providing a cushioned contact between the personnel and the sides of hatch 55. Without limitation, hatch protection system 5 provides protection against blunt force trauma (i.e., to the body and head) of personnel in hatch 55. Further, without limitation, hatch protection system 5 improves survivability as well as increases comfort to personnel. Hatch 55 may include any opening in a vehicle by which personnel may egress, ingress, and/or be disposed within (i.e., personnel standing with a portion of the personnel's body disposed in hatch 55). The military vehicle may be any type of military vehicle. Without limitation, military vehicles include landborne military vehicles (i.e., armored personnel carriers, tanks, and the like), water-borne military vehicles (i.e., boats, ships, and the like), and air-borne military vehicles (i.e., helicopters or planes).

Figure 15:
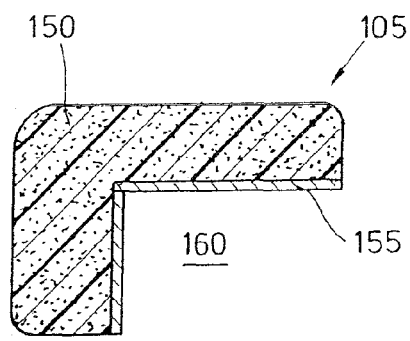
FIG. 15 illustrates a cross sectional side view of an embodiment of a hatch pad.

In embodiments as shown in FIGS. 1, 2, and 3, hatch pad 105 comprises protective padding. FIG. 15 illustrates a cross sectional side view of an embodiment of hatch pad 105 having protective padding 150 and substrate 155. Protective padding 150 may include any type of padding suitable for protecting the personnel against blunt force trauma from contact with hatch 55. Protective padding 150 may be any type of padding suitable for attenuating and/or absorbing energy (i.e., energy from a contact force). It is to be understood that attenuating energy refers to reducing the strength of energy. It is also to be understood that absorbing energy refers to the padding absorbing energy. In an embodiment, protective padding 150 includes an elastomer, foam, honeycomb structures, visco-elastic material, or any combinations thereof. The elastomer may be any elastomer that attenuates and/or absorbs energy. Without limitation, examples of suitable elastomers include polyurethane rubber, butyl rubber, silicone rubber, and the like. In an embodiment, the elastomer is butyl rubber. The foam may include any foam (i.e., metallic, non-metallic, or synthetic) that attenuates and/or absorbs energy. In an embodiment, the foam is polymeric foam. Any suitable polymeric foam that attenuates and/or absorbs energy may be used. Without limitation, examples of suitable polymeric foams include polyethylene foam, polyurethane foam, or any combinations thereof. In some embodiments, the foam includes metallic foam. Any metallic foam suitable for energy attenuation and/or absorption may be used. In an embodiment, the metallic foam includes nickel coated metallic foam. The visco-elastic material includes any suitable visco-elastic materials. Without limitation, examples of suitable visco-elastic materials include amorphous polymers, semi-crystalline polymers, bio-polymers, bitumen materials, or any combinations thereof. In some embodiments, protective padding 150 is tunable by selecting desired materials for a desired energy absorption and/or attenuation. For instance, the densities of the material selected to comprise protective padding 150 may be selected to provide the desired impact resistances. Without limitation, protective padding 150 may reduce accelerative injuries due to vehicle turnovers and the like. Further, without limitation, protective padding 150 may not have a significant reduction in impact resistance due to repeated routine contact with personnel and/or devices (i.e., weapons, etc.). In some embodiments, protective padding 150 has layers of different impact protection. In an embodiment, protective padding 150 has one or more high velocity impact protection layers and/or one or more low velocity impact protection layers. The high velocity impact protection layer and low velocity impact protection layer may include such as disclosed in patent application U.S. Ser. No. 13/364,234, filed Feb. 1, 2012, and entitled "Gunner Accessory Package," which is incorporated herein by reference in its entirety.

In embodiments as further shown in FIGS. 1, 2, and 3, the configuration of hatch pad 105 is selected to substantially cover the inner edge 160 of hatch 55. Without limitation, by such configuration of hatch pad 105, the personnel in hatch 55 contact hatch pad 105 instead of inner edge 160. In embodiments, hatch protection system 5 is installed on hatch 55 without altering the structural integrity of hatch 55 (i.e., hatch protection system 5 uses existing bolt holes and the like rather than drilling new holes into the structure of hatch 55). In such embodiments, the configuration of hatch protection system 5 is selected to substantially match the existing structure of hatch 55.

In an embodiment as shown in FIG. 15, hatch pad 105 has substrate 155. Substrate 155 may include any material that is substantially rigid. Without limitation, examples of suitable materials include metal, ceramic, composites, and the like. In embodiments, the material is metal. Further, without limitation, substrate 155 provides physical support to protective padding 150. In embodiments, substrate 155 is disposed on the underside of hatch pad 105, which, when installed on hatch 55, substrate 155 is disposed between protective padding 150 and inner edge 160. In alternative embodiments (not illustrated), hatch pad 105 does not have substrate 155 but instead comprises protective padding 150.

In embodiments as shown in FIGS. 1, 2, and 3, hatch pad 105 includes three sections, which are hatch pad section 10, hatch pad section 15, and hatch pad section 20. Without limitation, hatch pad 105 having such three sections facilitates transport of hatch pad 105 as well as installation of hatch pad 105 on hatch 55. In an embodiment as shown, hatch pad section 10 has a length greater than that of hatch pad section 15 or hatch pad section 20. It is to be understood that hatch pad 105 is not limited to three sections but in alternative embodiments may have less than three sections or more than three sections.

In embodiments as shown in FIGS. 1, 2, and 3, hatch pad 105 has hooks 40. Hooks 40 have a hollow interior through which bracket pins 80 may pass. Hooks 40 are secured to hatch pad 105. Hooks 40 may have any configuration suitable to allow bracket pins 80 to pass therethrough. In an embodiment as shown, hooks 40 have a substantially cylindrical configuration.

FIGS. 1 and 3 illustrate embodiments in which hatch protection system 5 has a bracket (either pin bracket 25 or bracket mount 35) at the intersection where two hatch pad sections meet. Either pin bracket 25 or bracket mount 35 may be used at an intersection. In embodiments as shown, hatch protection system 5 has a pin bracket 25 at the intersection of hatch pad sections 15 and 20 and a bracket mount 35 at the intersection of each of hatch pad sections 10 and 15 as well as the intersection of hatch pad sections 10 and 20. In such embodiments, hatch protection system 5 has two pin brackets 25 attached to hatch pad section 10 on an opposing side of hatch pad 105 from the pin bracket 25 at the intersection of hatch pad sections 15 and 20. Without limitation, hatch pad section 10 has two pin brackets 25 because of its length, and the two pin brackets 25 facilitate the attachment of hatch pad section 10 to hatch 55.

In an embodiment as shown in FIGS. 1, 2, 3, and 4, hatch protection system 5 includes bracket mount 35. In such embodiments, one of the hatch pad sections at the intersection (for instance, either hatch pad section 10 or hatch pad section 15 at such intersection and either hatch pad section 10 or hatch pad section 20) has an integral pin 45 and the other hatch pad section at the intersection has a pin hole (not illustrated) through which integral pin 45 may pass when the hatch pad sections 15, 20 are attached. Integral pin 45 is secured to hatch pad section 15 or hatch pad section 20. In further embodiments as shown, each of the hatch pad sections 10, 15, and 20 have a contact surface 50 at the intersection of the other hatch pad section (i.e., the intersection of hatch pad sections 10, 15 and the intersection of hatch pad sections 10, 20). Bracket mount 35 includes bracket base 60 and bracket attachment 165. Bracket attachment 165 engages integral pin 45, and bracket base 60 is secured to hatch 55. Bracket base 60 is secured to hatch 55 by any suitable means such as by screws or bolts. In some embodiments, securing means 65 further secure the two hatch pad sections to each other. Securing means 65 may be any suitable attachment means such as a bolt, screw, pin, or the like. In an embodiment as shown, securing means 65 is a screw that passes through walls 70 of hatch pad sections 15, 20 and through bracket attachment 165.

Figure 7:
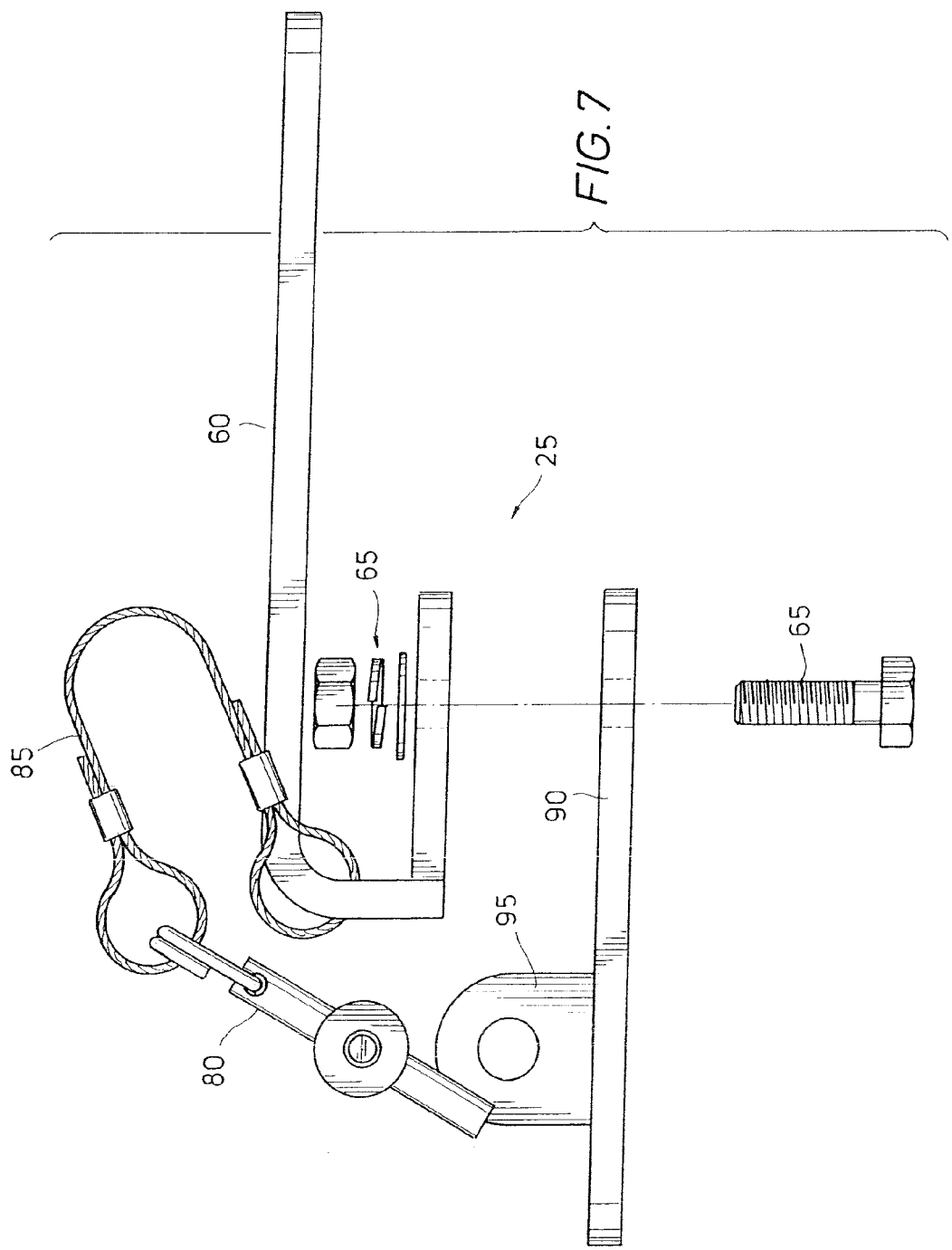
FIG. 7 illustrates an exploded view of an embodiment of a pin bracket.

FIGS. 1, 2, 3, 5, 6, and 7 illustrate an embodiment of hatch protection system 5 in which hatch protection system 5 includes pin bracket 25. FIG. 7 illustrates an exploded side view of pin bracket 25. Pin bracket 25 includes bracket base 60, bracket pin 80, and bracket pin base 90. In embodiments, bracket base 60 is secured to hatch 55 by bracket securing means 75. Bracket securing means 75 may include any means suitable for securing bracket base 60 to hatch 55 such as by screws, bolts, adhesives, and the like. In an embodiment as shown, bracket securing means 75 are screws. Bracket base 60 has openings 170 through which bracket securing means 75 secure bracket base 60 to hatch 55. In embodiments, installation using bracket securing means 75 uses existing structure of hatch 55 without modifying hatch 55 (i.e., without drilling holes for bracket securing means 75 into hatch 55). In such embodiments, openings 170 are configured to substantially match existing structure in hatch 55 by which bracket securing means 75 secures bracket base 60 to hatch 55. Bracket pin base 90 is secured to bracket base 60 by securing means 65, which may include any means suitable for securing bracket pin base 90 to bracket base 60 such as pins, screws, bolts, and the like. In embodiments as shown, securing means 65 are screws. Bracket pin base 90 includes pin receptacles 95. In an embodiment in which pin bracket 25 is attached to hatch pad sections 15 and 20, pin bracket 25 is positioned so that hooks 40 are disposed between pin receptacles 95, which allows bracket pin 80 to be inserted through pin receptacles 95 and hooks 40. In an embodiment in which a pin bracket 25 is attached to hatch pad section 10, such pin bracket 25 is positioned so that hook 40 is disposed between pin receptacles 95, which allows bracket pin 80 to be inserted through pin receptacles 95 and hook 40. In an alternative embodiment (not illustrated), bracket pin base 90 is slidable until secured to bracket base 60. In some embodiments, bracket pin 80 is attached to bracket base 60 by pin lanyard 85.

Figure 8:
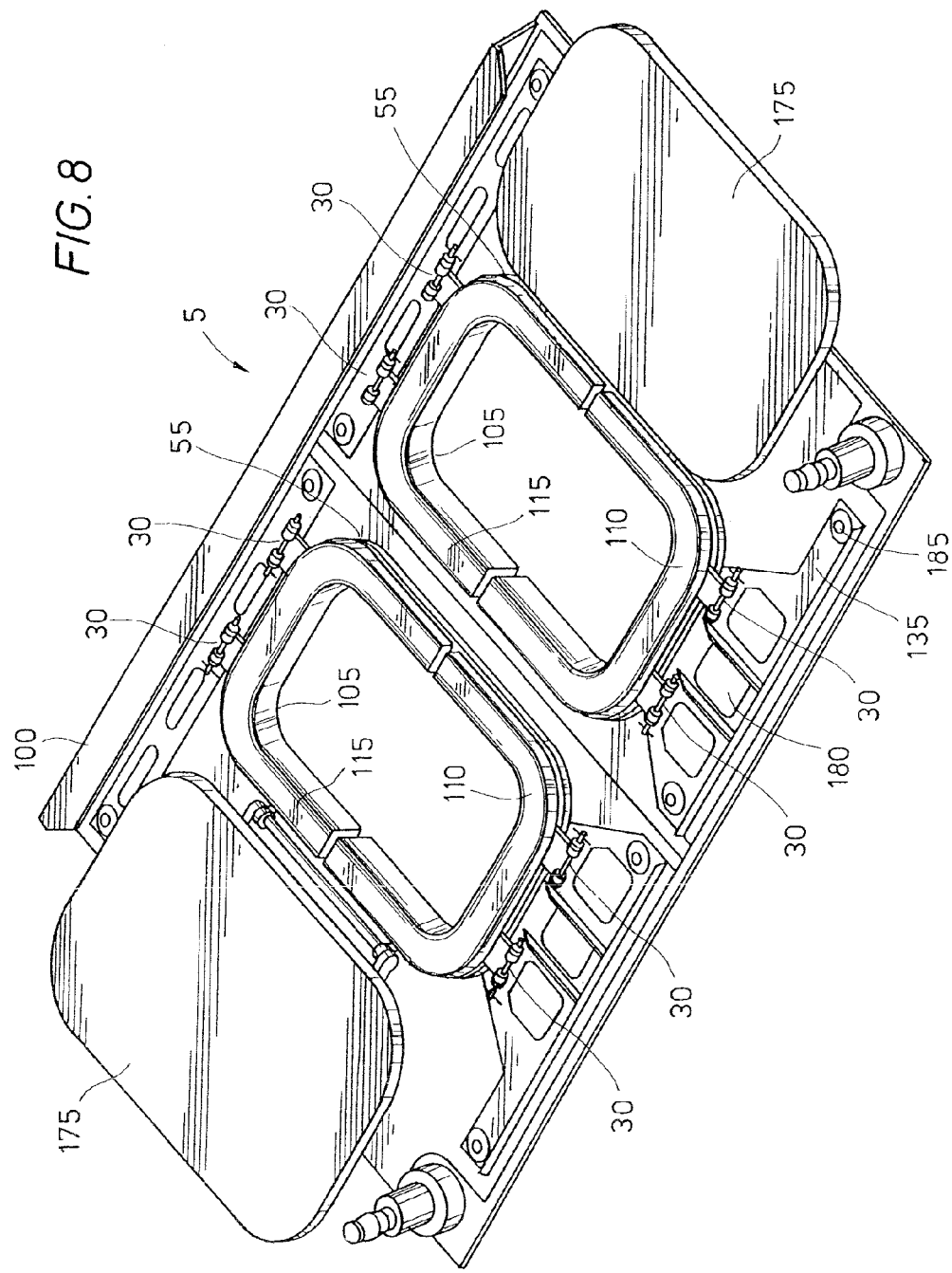
FIG. 8 illustrates an embodiment of a hatch protection system with hinged brackets in the down position.
Figure 9:
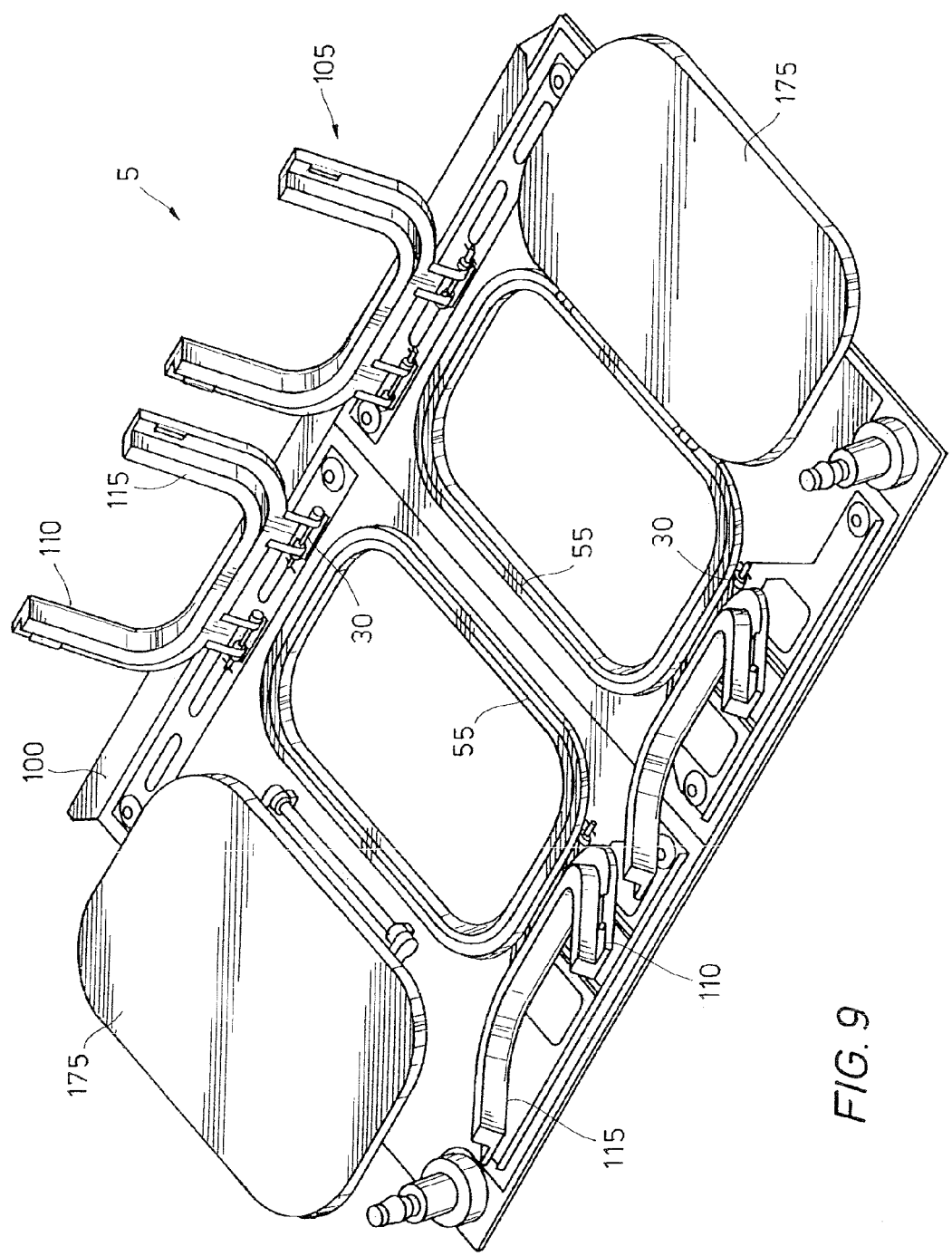
FIG. 9 illustrates an embodiment of a hatch protection system with hinged brackets in the up position.

FIGS. 8 and 9 illustrate embodiments of hatch protection system 5 in which hatch protection system 5 has hinged brackets 30. Hinged brackets 30 allow hatch pads 105 to be raised and lowered. FIG. 8 illustrates an embodiment of hatch protection system 5 in which hatch pads 105 are in the down position. FIG. 9 illustrates an embodiment of hatch protection system 5 in which hatch pads 105 are in the up position (i.e., hatch pad sections 110, 115 are in the up position). In such embodiments, hatch pads 105 have two sections per hatch 55, which are hatch pad sections 110 and 115. It is to be understood that such embodiments of hatch protection system 5 are not limited to hatch pad sections 110 and 115 but in alternative embodiments (not illustrated) hatch protection system 5 may have one hatch section or more than two hatch sections per hatch 55. By hinged brackets 30 allowing hatch pads 105 to be in the up position, the available space for ingress/egress of personnel and equipment through hatch 55 may be increased. In the embodiments shown in FIGS. 8 and 9, hatch covers 175 are in the up (open) position. In some embodiments, hatch pads 105 are in the up position when hatch covers 175 are closed. In other embodiments, hatch pads 105 may be removed when in the up position and when hatch cover 175 is closed. In the embodiments shown in FIGS. 8 and 9, hatches 55 are disposed at vehicle top 100.

Figure 10:
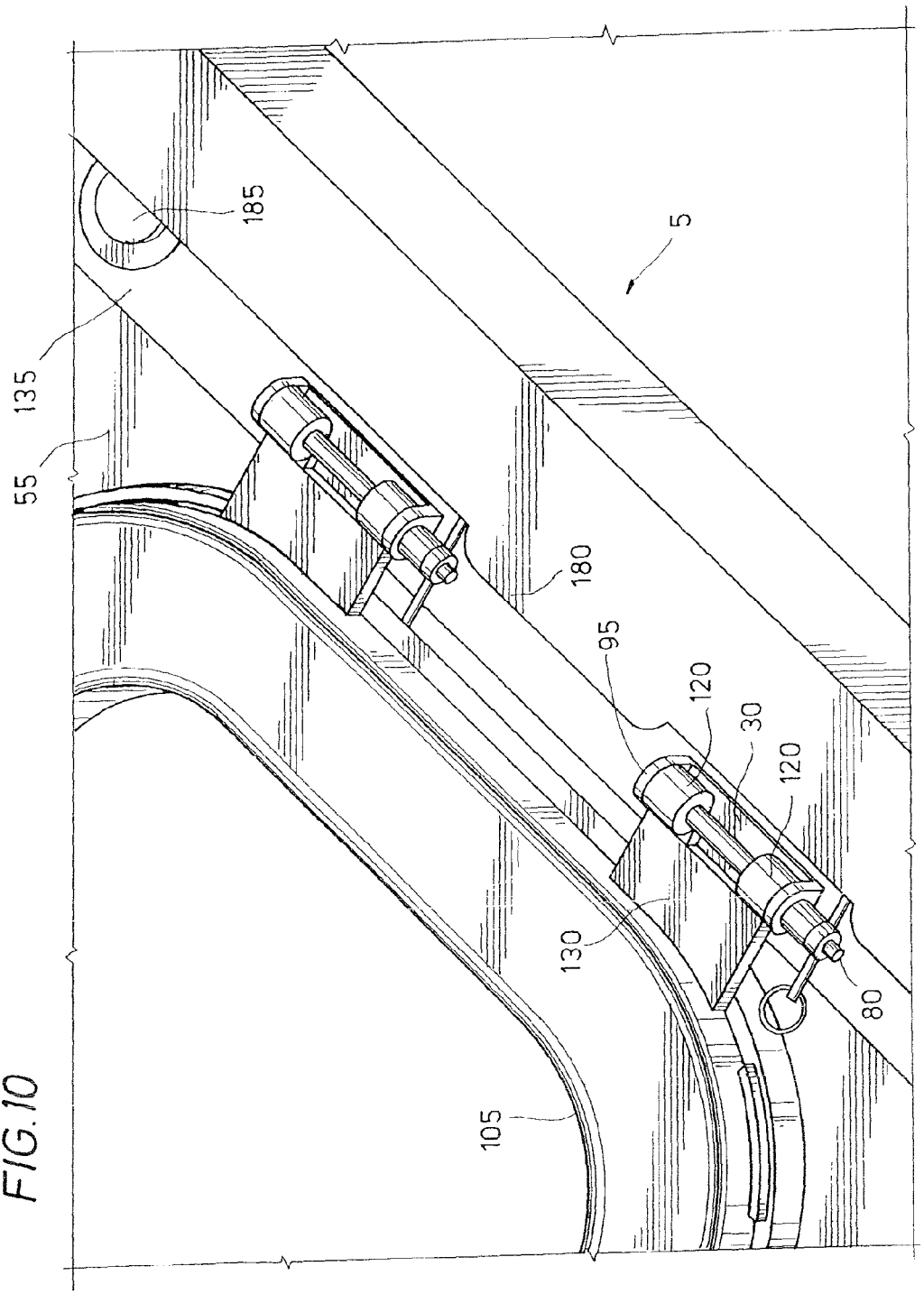
FIG. 10 illustrates an embodiment of hinged brackets.

In embodiments as shown in FIGS. 8, 9, and 10, each hinged bracket 30 is secured to a hinged bracket base 135 that is secured to hatch 55 by securing means 185. Securing means 185 may include any means suitable for securing hinged bracket base 135 to hatch 55 such as screws, pins, bolts, and the like. In an embodiment as shown, securing means 185 are screws. In embodiments, installation using securing means 185 uses existing structure of hatch 55 without modifying hatch 55 (i.e., without drilling holes for securing means 185 into hatch 55). In some embodiments, hinged bracket brace 135 has removed sections 180. Without limitation, removed sections 180 reduce the weight of hinged bracket 30. In embodiments as shown, each of hatch pad sections 110, 115 has two hinged bracket hooks 120 that are secured to each hatch pad section 110, 115 by a hook base 130. In embodiments as shown, each hatch pad section (110 or 115) has two hook bases 130 that are about the same distance apart as the corresponding pin receptacles 95 on hinged bracket base 135. In alternative embodiments (not illustrated), hatch pad sections 110, 115 may have one or more than two hinged bracket hooks 120 and correspondingly one or more than two pin receptacles 95. The hatch pad sections 110 or 115 may be positioned where hinged bracket hooks 120 are disposed between the pin receptacles 95, and a bracket pin 80 may then be inserted through the pin receptacles 95 and hinged bracket hooks 120 to attach hatch pad sections 110 and 115 to hatch 55. Rotation of hinged bracket hooks 120 on bracket pin 80 allows hatch pad sections 110, 115 to move up and down.

Figure 11:
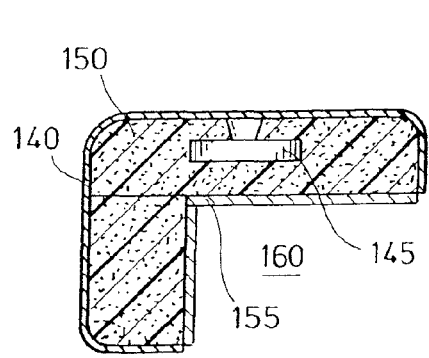
FIG. 11 illustrates an embodiment of a hatch pad having an expandable surface that is not expanded.
Figure 12:
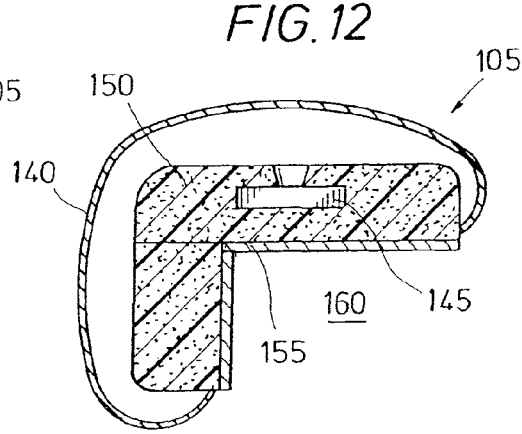
FIG. 12 illustrates an embodiment of a hatch pad having an expandable surface that is expanded.
Figure 13:
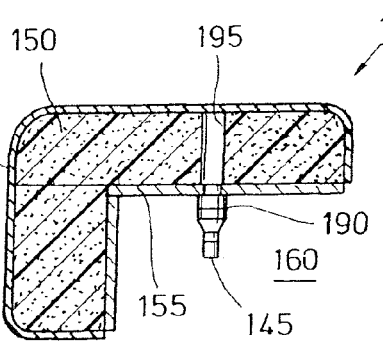
FIG. 13 illustrates an embodiment of a hatch pad having an expandable surface that is not expanded.
Figure 14:
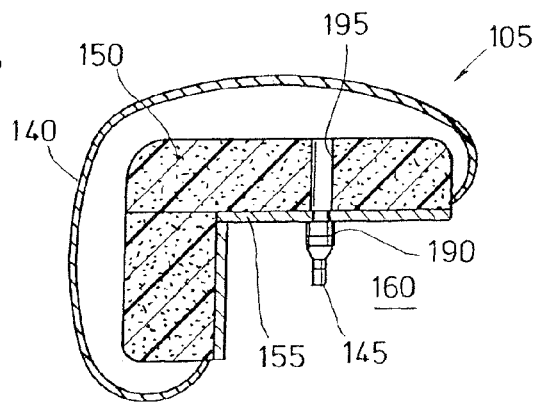
FIG. 14 illustrates an embodiment of a hatch pad having an expandable surface that is expanded.

FIGS. 11, 12, 13, and 14 illustrate embodiments of hatch pad 105 in which hatch pad 105 has expandable surface 140. FIGS. 11 and 13 illustrate embodiments in which expandable surface 140 has not been inflated. FIGS. 12 and 14 illustrate embodiments in which expandable surface 140 has been expanded. Without limitation, an expanded expandable surface 140 provides protection in addition to that of protective padding 150 to personnel against blunt trauma from contact with hatch 55. In embodiments as shown, hatch pad 105 has expandable surface 140 disposed on the opposing side of hatch pad 105 from substrate 155. Expandable surface 140 may be composed of any expandable material such as rubber, nylon, polychloroprene, latex, or any combinations thereof. In such embodiments, hatch pad 105 has inflator 145 that provides inflation to expand expandable surface 140. Inflator 145 may include any means suitable for inflating expandable surface 140. FIGS. 11 and 12 show embodiments in which inflator 145 is disposed within protective padding 150. In such embodiments, upon a sufficient contact force against hatch pad 105, inflator 145 is actuated and inflates expandable surface 140. FIGS. 13 and 14 illustrate an embodiment in which inflator 145 has a nozzle 190 disposed outside of hatch pad 105 and that takes outside gas (i.e., air or another sufficient gas/vapor) and through a channel 195 provides the gas to expandable surface 140 to expand expandable surface 140.

In alternative embodiments, hatch pads 105 are attached to hatch 55 by brackets (i.e., pin bracket 25, hinged bracket 30, bracket mount 35, or any combinations thereof), an adhesive, an attachment mechanism, or any combinations thereof. The adhesive may include any suitable adhesive for attaching a hatch pad 105 to a hatch 55. The attachment mechanism may be any suitable mechanism for attaching a hatch pad 105 to a hatch 55 such as VELCRO® (a registered trademark of Velcro Industries B.V.).

Although the present invention and its advantages have been described in detail, it should be understood that various changes, substitutions and alterations may be made herein without departing from the spirit and scope of the invention as defined by the appended claims.

What is claimed is:

1. A hatch protection system for a hatch on a vehicle, comprising:
   a hatch pad, wherein the hatch pad is attached to the hatch, and wherein the hatch pad comprises a protective padding, wherein the protective padding has a high velocity impact protection layer a low velocity impact protection layer; and further wherein the hatch pad is adapted to be raised and lowered while remaining attached to the vehicle; and
   a plurality of brackets, wherein the plurality of brackets are secured to the vehicle and to the hatch pad.

2. The hatch protection system of claim 1, wherein the hatch pad comprises a substrate.

3. The hatch protection system of claim 1, wherein the hatch pad comprises a first hatch pad section, a second hatch pad section, and a third hatch pad section.

4. The hatch protection system of claim 3, wherein the first hatch pad section has a length greater than that of the second hatch pad section or the third hatch pad section.

5. The hatch protection system of claim 3, wherein the first hatch pad section is attached to the second hatch pad section and the third hatch pad section, and the second hatch pad section is attached to the third hatch pad section.

6. The hatch protection system of claim 5, wherein a first bracket and a second bracket are attached to the first hatch pad section and the vehicle, and wherein a third bracket is attached to the vehicle and to the second hatch pad section and the third hatch pad section.

7. The hatch protection system of claim 6, wherein the third bracket is disposed on an opposing side of the hatch from the first bracket and the second bracket.

8. The hatch protection system of claim 6, wherein the first bracket comprises a first bracket pin, the second bracket comprises a second bracket pin, and the third bracket comprises a third bracket pin, and wherein the first hatch pad section comprises a first hook and a second hook, and wherein the second hatch pad section comprises a third hook and the third hatch pad section comprises a fourth hook, and further wherein the first bracket pin is inserted into the first hook, the second bracket pin is inserted into the second hook, and the third bracket pin is inserted into the third hook and the fourth hook.

9. The hatch protection system of claim 5, wherein a first bracket is attached to the vehicle and to the first hatch pad section and the second hatch pad section, and wherein a second bracket is attached to the vehicle and to the first hatch pad section and the third hatch pad section.

10. The hatch protection system of claim 9, wherein the first bracket is disposed on an opposing side of the hatch from the second bracket.

11. The hatch protection system of claim 5, wherein a first pin is disposed in the first hatch pad section and the second hatch pad section, and wherein a second pin is disposed in the first hatch pad section and the third hatch pad section.

12. The hatch protection system of claim 1, wherein the brackets comprise hinged brackets.

13. The hatch protection system of claim 12, wherein the hatch pad comprises a first hatch pad section and a second hatch pad section, wherein the first hatch pad section and the second hatch pad section are adapted to be raised and lowered.

14. The hatch protection system of claim 13, wherein a first hinged bracket is attached to the first hatch pad section and a second hinged bracket is attached to the second hatch pad section.

15. The hatch protection system of claim 14, wherein the first hatch pad section comprises a first hinged bracket hook and a second hinged bracket hook and the second hatch pad section comprises a third hinged bracket hook and a fourth hinged bracket hook, and wherein the first hinged bracket comprises a first bracket pin, and the second hinged bracket comprises a second bracket pin, and further wherein the first bracket pin is inserted into the first hinged bracket hook and the second hinged bracket hook, and the second bracket pin is inserted into the third hinged bracket hook and the fourth hinged bracket hook.

16. The hatch protection system of claim 13, wherein a first hinged bracket and a second hinged bracket are attached to the first hatch pad section and the vehicle, and a third hinged bracket and fourth hinged bracket are attached to the second hatch pad section and the vehicle.

17. The hatch protection system of claim 12, wherein each hinged bracket is secured to a hinged bracket base.

18. The hatch protection system of claim 12, wherein the hatch pad is detachable from the hatch.

19. The hatch protection system of claim 1, wherein the hatch pad further comprises an expandable surface.

20. A method for protecting personnel against blunt force trauma from contact with a hatch on a vehicle, the method comprising:
   (A) attaching a plurality of brackets to the vehicle; and
   (B) attaching a hatch pad to the brackets, wherein the hatch pad comprises a protective padding, wherein the protection padding has a high velocity impact protection layer and a low velocity impact protection layer, and wherein the hatch pad comprises more than one hatch pad section, and further wherein the hatch pad substantially covers an inner edge of the hatch.

* * * * *